July 6, 1965

G. H. PORATH 3,193,334

GIMBALING SYSTEM

Filed Dec. 10, 1962

INVENTOR.
GORDON H. PORATH

BY
Barnes, Kisselle,
Raisch & Choate
ATTORNEYS

July 6, 1965 G. H. PORATH 3,193,334
GIMBALING SYSTEM

Filed Dec. 10, 1962 5 Sheets-Sheet 4

INVENTOR.
GORDON H. PORATH
BY
Barnes, Kisselle, Raisch & Choate
ATTORNEYS

United States Patent Office 3,193,334
Patented July 6, 1965

3,193,334
GIMBALING SYSTEM
Gordon H. Porath, 6101 Concord, Detroit, Mich.
Filed Dec. 10, 1962, Ser. No. 243,346
19 Claims. (Cl. 308—9)

This application is a continuation-in-part of my prior pending application Serial No. 173,532, filed February 15, 1962, now abandoned.

This invention relates to instrumentation and particularly to gimbaling systems for holding precision devices such as instruments for calibration about stable, smooth, accurate frictionless vertical and horizontal axes and for rotation about such axes without deviation.

In the calibration of instruments such as gyroscopic control devices for missiles and the like, it is necessary to simulate certain actions in order to calibrate the instruments. In one type of calibration, it is necessary to hold and rotate the instrument about stable, smooth, accurate, frictionless vertical and horizontal axes. Heretofore such gimbaling systems have utilized accurately formed ball or roller bearings. Since such bearings operate upon a frictional contact, the degree of accuracy that can be obtained is limited regardless of how accurately the parts are formed and selectively matched. In addition, they are subject to wear.

It is therefore an object of this invention to provide a gimbaling system which does not utilize metal-to-metal contact in the bearing areas and wherein the gimbal ring is supported about stable, accurate, smooth vertical and horizontal axes.

It is a further object of the invention to provide such a gimbaling system in which all metal-to-metal friction is completely eliminated.

It is a further object of the invention to provide such a gimbaling system which utilizes pressurized liquid from an external source as the load supporting medium between the table and the base.

Basically, the gimbal system comprises a base, a table rotatably mounted relative to the base about a vertical axis, and a gimbal ring rotatably mounted relative to the two space stanchions on the table about horizontal axis. The base is provided with a vertical opening defining a cylindrical surface and is formed with radially extending surfaces extending outwardly from the periphery of the cylindrical surface. A plurality of circumferentially spaced pockets or pressure pads are formed along the cylindrical and radial surfaces of the base. An orifice is associated with each pressure pad and viscous liquid under pressure from an external source is supplied to each pad through the orifice. The table is provided with complementary cylindrical and radial surfaces in juxtaposition to the surfaces of the base and the relative dimensions of the base and table are such that the liquid in the pressure pads flows continuously in a thin low velocity film between the surfaces of the base and table in such a manner that the table is effectively supported at all times in stable position relative to the base. When a load is applied to the table, either axially or radially, the table tends to move toward one pad or pads so that the flow of liquid from these pads is restricted. Since the liquid is being supplied continuously to each pad, the pressure in the pads increases. At the same time, the table tends to move away from the opposite pad or pads, unrestricting the flow and the pressure in these pad or pads decreases. As a result, a pressure differential is created that tends to retain the table in its original position. The table thus has no metal-to-metal contact with the base. One of the supports of the table is provided with a horizontal cylindrical surface and radial surfaces extending from the support. Each of these surfaces is formed with a plurality of circumferentially spaced pressure pads and an orifice is associated with each pad. The gimbal ring has corresponding cylindrical and radial surfaces so that as a result one end of the gimbal ring is supported axially and radially relative to the support. The other support is formed with a cylindrical surface only and the gimbal ring has a corresponding portion extending through the surface. This surface of the support is formed with a plurality of circumferentially spaced pressure pads and associated orifices providing a radial support only for the second end of the gimbal ring. By this arrangement, one support effectively supports the gimbal ring both radially and axially and the other support supports the gimbal ring only against axial movement. Liquid under pressure is provided to each pressure pad in the support in the same manner as in the table and the flow of liquid in a continuous low velocity film is similar between the surfaces to prevent metal-to-metal contact and to hold the gimbal ring in stable rotational position about a horizontal axis relative to the table.

In the drawings:

FIG. 6 is a fragmentary sectional view on an enlarged scale taken along the line 6—6 in FIG. 4.

Figure 1:
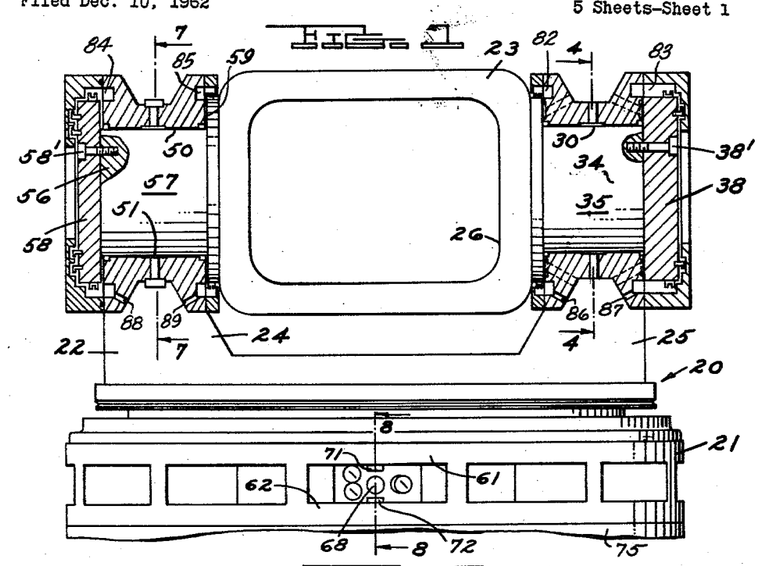
FIG. 1 is a part sectional fragmentary elevation of a gimbaling system embodying the invention.

Referring to FIG. 1, the gimbaling system 20 comprises a base 21 whereby the system is supported on a firm foundation such as a floor, a table 22 rotatably mounted relative to the base 21 about a vertical axis and a gimbal ring 23 rotatably mounted on stanchions 24, 25 of the table. Gimbal ring 23 is rectangular in shape defining an opening 26. An instrument which is to be calibrated is supported on the ring 23.

Figure 4:
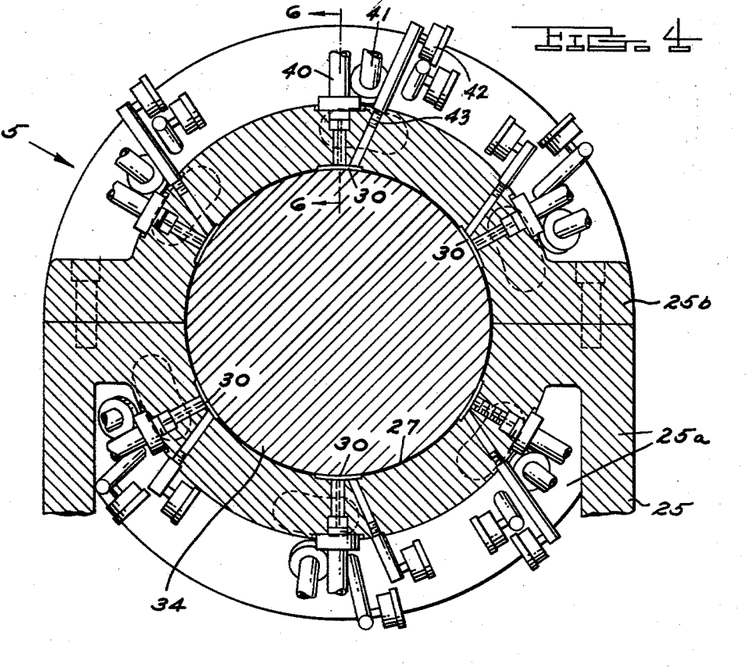
FIG. 4 is a fragmentary sectional view taken along the line 4—4 in FIG. 1 on an enlarged scale.

Referring to FIGS. 1, 4, 6, first stanchion 25 on table 22 is provided with a fixed portion 25a and a removable cap portion 25b held in position by bolts, which have semi-cylindrical surfaces that form a horizontal cylindrical opening 27 defining a cylindrical surface and radially outwardly extending surfaces 28, 29. A plurality of circumferentially spaced pockets or pressure pads 30 are formed on the surface 27. Circumferentially spaced pockets or pressure pads 31, 32 are similarly formed on the radial surfaces 28, 29. An orifice defined by a capillary tube 33 is associated with each pressure pad and liquid from an external source is supplied under pressure to each orifice and, in turn, through the orifice to the pressure pad.

Gimbal ring 23 includes a cylindrical projection 34 which has a complementary surface 35 to the surface 27 of the stanchion 25. The gimbal ring also includes a first radial surface 36 which is complementary to the surface 28 and a second radial surface 37 complementary to the radial surface 29. The latter surface 37 is defined by a thrust plate 38 having an accurately machined surface mounted adjacent the accurately machined diametral surface on the end of the portion 34 by bolts 38'. This facilitates the formation of the surface 37 since it is easier to machine a flat plate than a re-entrant surface as would be the case if the plate 39 were integral with the portion 34.

Figure 5:
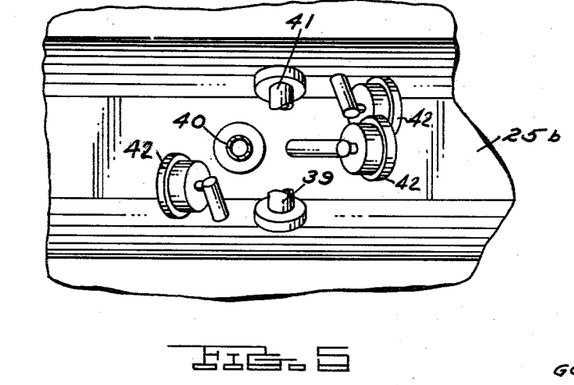
FIG. 5 is a fragmentary view in the direction of the arrow 5 in FIG. 4.

The relative dimensions of the adjacent surfaces 27, 35 and 28, 36 and 29, 37 are such that a laminar film of liquid flows continuously at low velocity between the surfaces and the pressure of the liquid drops to zero as it leaves the surfaces. The number and size of pressure pads is such as to support the load and will vary depending upon the size of the load to be supported. A minimum of three circumferentially spaced pads is required. The inlet tubes 39, 40, and 41 may be connected to a common pressure source which supplies the liquid such as a viscous oil or the like to the pressure pads. The liquid is reduced to a predetermined pressure by the capillaries 33 so that the pressure in the pads is at a predetermined pressure. It is essential that the pressures in the pads 31, 32 be equal to one another and that the pressure in the pads 30 be equal. Accordingly, a pressure gauge 42 (FIGS. 4, 5) is provided in association with each pressure pad and is connected to the pressure pad through a passage 43. The pressure gauge facilitates the initial setup of the table in that the capillaries can be changed in size until the pressure in each set of pressure pads 30, 31 or 32 is as desired. In addition, the pressure gauge 42 will indicate in the event that a capillary becomes clogged so that the capillary can be cleaned or replaced.

By the above described arrangement, the one end of the gimbal ring is maintained for stable, accurate, smooth, frictionless rotation about a horizontal axis.

Figure 7:
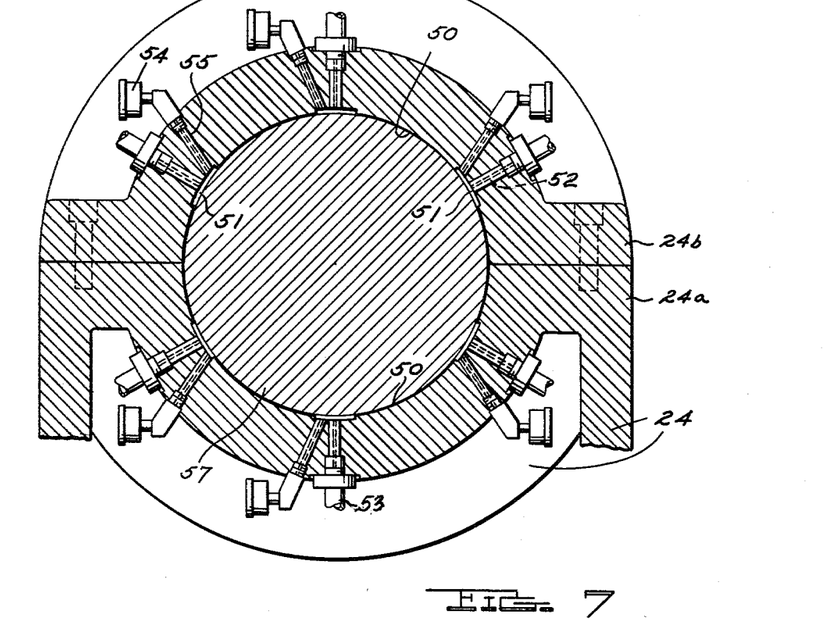
FIG. 7 is a fragmentary sectional view taken along line 7—7 in FIG. 1.

The other end of the gimbal ring is supported against radial loads by an arrangement as shown in FIGS. 1 and 7 wherein the second stanchion 24 has a fixed portion 24a and a removable cap portion 24b held in position by bolts to form a horizontal opening defining a cylindrical surface 50 having a plurality of circumferentially spaced pressure pads 51 therein. An orifice or metering device in the form of a capillary 52 is associated with each pressure pad and liquid is supplied under pressure to each orifice through an inlet 53. A pressure gauge 54 is connected to each pressure pad through a passage 55. The gimbal ring 23 is formed with a second portion 56 defining a cylindrical surface 57 that is juxtaposed adjacent surface 50. The relative dimensions of the surfaces 50, 57 is such that a laminar film of liquid flows continuously at low velocity between the surfaces and the pressure of the liquid drops to zero as it leaves the surfaces. By this arrangement, radical compensation is achieved for any loads on the gimbal ring. A plate 58 is bolted on the end of portion 56 by bolts 58' but the surfaces of the plate are spaced substantially from the radial surface of the stanchion 24 so that the fluid flows freely between the adjacent surfaces of the plate and support. Similarly, radial surface 59 of gimbal ring 23 is spaced substantially from the corresponding radial surface of the stanchion 24.

Figure 2:
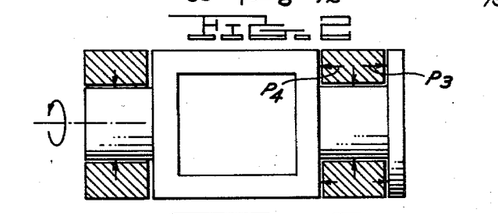
FIG. 2 is a diagrammatic vertical section showing the support of the gimbal ring.
Figure 3:
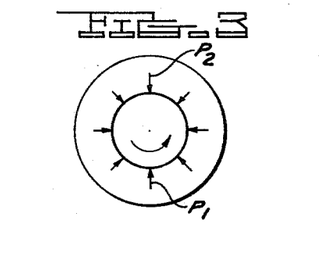
FIG. 3 is a diagrammatic view showing the radial support of the gimbal ring.

The manner in which the gimbal table provides a stable, accurate, smooth, frictionless horizontal axis of rotation for the gimbal ring 23 can be more readily understood by referring to FIGS. 2 and 3. As shown in FIG. 3, in the event that a radial force is applied to the gimbal ring 23, for example, in a downward direction, the pressure in the lower pad 30 or 51 as the case may be is increased as represented by the arrow $P_1$ due to the restricting action and the pressure in the opposed pad represented by the arrow $P_2$ will be decreased because of the unrestricting action so that a force is applied on the portions 35 or 57 as the case may be of the gimbal ring 23 upwardly tending to return the gimbal ring to its initial position. Similarly, if an axial load is applied to the gimbal ring tending to move the gimbal ring to the right (FIG. 2), the pressure $P_3$ in one of the pads 32 will increase because of the restricting action and the pressure in the opposed pad $P_4$ will decrease tending to provide a force to the left to return the gimbal ring to its original position. The pressures supplied to the pads are in excess of the applied load and, as a result, the relative movements herein indicated are very slight and cannot be measured.

By the above described arrangement, the gimbal ring is maintained in a stable, smooth, accurate, frictionless horizontal axis. In addition, because of the fully compensated effect of the pads, minor surface or machining inaccuracies that inherently occur in the manufacture of commercial machines are compensated for.

The provision of the removable separable caps 24b, 25b permits gimbal ring 23 to be made in a single piece and readily applied to the stanchions with the provision of the same accuracy as if the stanchions were made in a single piece.

Figure 8:
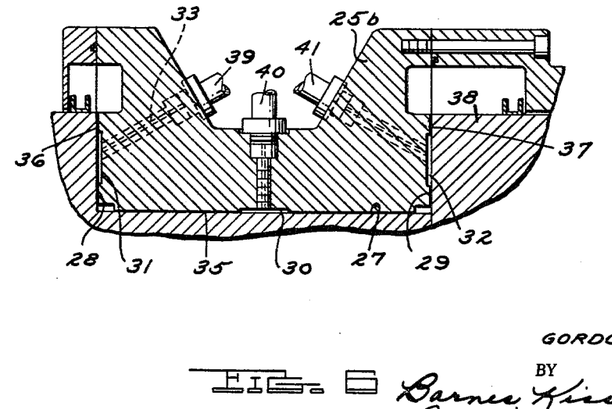
FIG. 8 is a sectional view taken along the line 8—8 in FIG. 1.
Figures 11, 12:
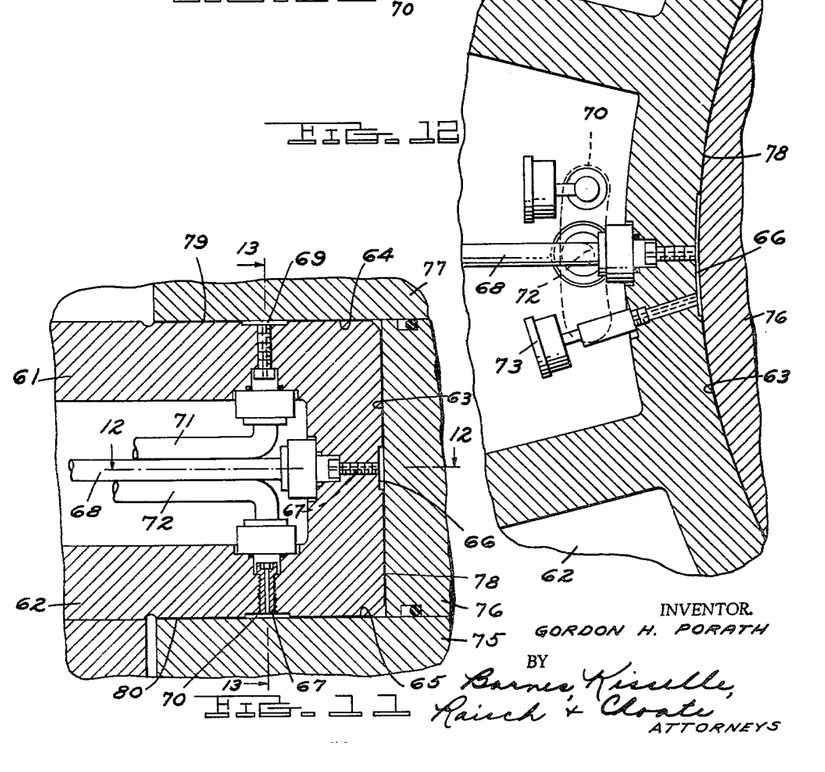
FIG. 11 is a fragmentary sectional view taken along the circle 11 in FIG. 8.
FIG. 12 is a fragmentary sectional view taken along the line 12—12 in FIG. 11.
Figure 13:
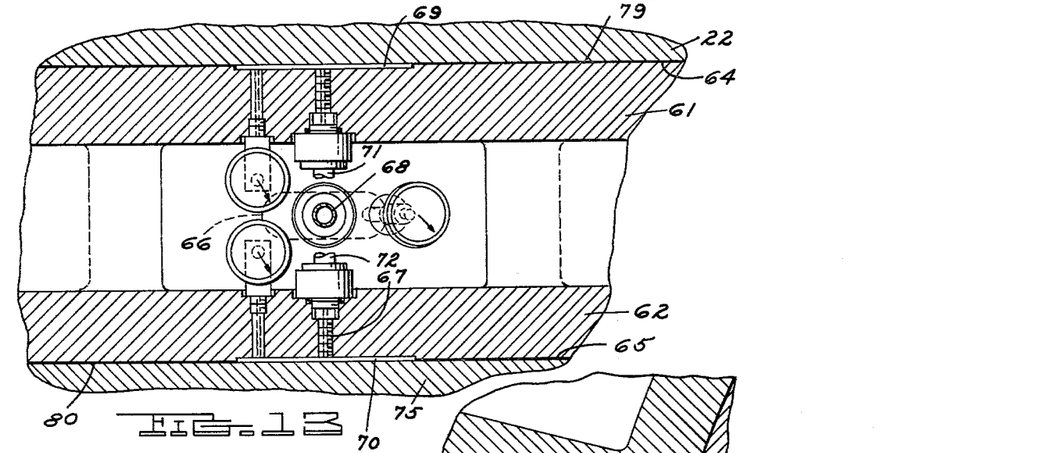
FIG. 13 is a fragmentary sectional view taken along the line 13—13 in FIG. 11.

Referring to FIG. 8, the base 21 on which the table 22 is rotatably supported about a vertical axis comprises a member 61 bolted on the base by bolts 62 and formed with a vertical opening defining a cylindrical surface 63 (FIGS. 11 and 12), and radial annular surfaces 64, 65 extending outwardly from the axial extremities of the cylindrical surface 63. Surface 63 is formed with a plurality of circumferentially spaced pockets or pressure pads 66 to each of which liquid under pressure is supplied through an orifice defined by a capillary 67. Liquid is supplied to the capillary 67 through a line 68. The surfaces 64, 65 are similarly formed with circumferentially spaced pressure pads 69, 70 to which liquid is supplied under pressure by orifices 67 through lines 71, 72. A pressure gauge 73 is provided for each pressure pad and communicates with its respective pressure pad through a passage.

As further shown in FIGS. 8 and 11–13, the table 22 is formed adjacent its lower end in three sections 75, 76 and 77 which are bolted together. The adjacent surfaces of the sections 75, 76 and 77 are machined flat and the peripheries of the sections 75 and 77 extend radially outwardly beyond the periphery of the intermediate section 76 to thereby define a cylindrical surface 78 complementary to the surface 63 in the base and radial surfaces 79, 80 complementary to the surfaces 64, 65, respectively. The relative dimensions of the adjacent surfaces of the base 21 and table 22 are such that a laminar film of liquid flows continuously at low velocity between the surfaces and the pressure of the liquid drops to zero as it leaves the surfaces.

Figure 9:
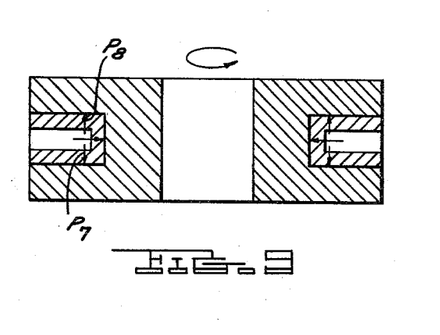
FIG. 9 is a diagrammatic vertical section showing the support of the table in FIG. 8.
Figure 10:
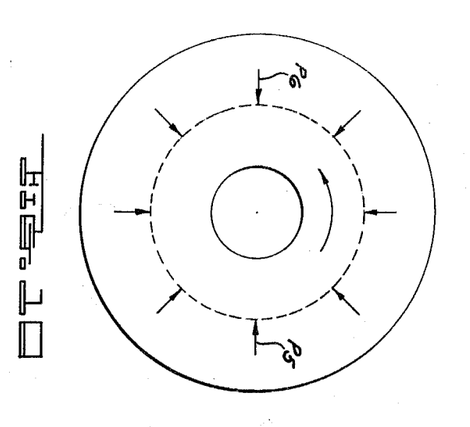
FIG. 10 is a diagrammatic plan view showing the support of the table in FIG. 8.

The manner in which the surfaces between the base and table compensate to provide a stable vertical axis of rotation is more clearly shown by referring to the diagrammatic drawings in FIGS. 9 and 10. In the event that a load is applied to the table 22 tending to cause it to deviate from a vertical axis, the pressure $P_5$ in one of the pads 66 increases because of the restricting action and the pressure $P_6$ in an opposed pad decreases because of the unrestricting action producing a force that tends to return the table to its original position. The support of the table for free unrestricted movement about the vertical axis is achieved by the pads 69, 70. Thus, the weight and, in turn, any load on the table tending to move the table downwardly causes the pressure $P_7$ to one of the pads 70 to increase because of the restricting action and the pressure $P_8$ in an opposed pad to decrease because of the unrestricting action tending to cause the force upwardly to support the load on the table. The table is thereby maintained out of metal-to-metal contact between the adjacent surfaces of the table and base.

As heretofore mentioned, the relative dimensions between the pressure pads are provided such that the liquid flows continuously at low velocity and drops to zero as it leaves the surfaces. The space between the surfaces ranges between two-thousandths (0.002) of an inch and one ten-thousandth (0.0001) of an inch and preferably ranges between one-thousandth (0.001) of an inch and one ten-thousandth (0.0001) of an inch. In larger diameters or larger surfaces where machining limitations prevent such close tolerances, at least some portions of the surfaces are dimensioned such that a space is provided within the above limits.

Provision is made for draining the liquid flowing through the pressure pads to a common collecting area 81 in the base 21 (FIG. 8). Referring to FIG. 1, the liquid from pressure pads 30, 31 and 32 collects in annular drain passages 82, 83. The liquid from pressure pads 51 collects in annular drain passages 84, 85. The liquid in turn flows from these passages through ports or passages 86, 87, 88, 89 through passages (not shown) to an annular collecting area 90 formed by a sealing ring 91 on base 21. From the annular collecting area 90, the liquid flows through vertical passages 92 in member 61 and passage 93 in base 21 to the common collecting area 81.

Similarly, liquid from pressure pads 66, 69 and 70 drains through passages 94, 92 and 95 (FIG. 8) to the common collecting area 81.

It can thus be seen that there has been provided a system wherein the table 22 and gimbal ring 23 are supported about stable, smooth, accurate, frictionless axes with metal-to-metal contact completely eliminated. Since in gimbaling systems it is customary to move the table and gimbal ring by a servo system, the invention permits a gimbaling system which does not have any lag such as would be encountered in systems wherein there is metal-to-metal friction.

I claim:

1. In a gimbal table for mounting an instrument or the like for movement about accurately determined horizontal and vertical axes, the combination comprising
    a base,
    a table mounted on said base for rotation about a vertical axis,
    and a gimbal member mounted on said table for rotation about a horizontal axis,
    said base having a vertical opening therein defining a cylindrical surface,
    and axially spaced, oppositely facing radial surfaces projecting horizontally from said cylindrical surface,
    each of said surfaces having a plurality of circumferentially spaced pressure pads therein,
    an orifice associated with each pressure pad,
    means for supplying liquid under pressure to each said orifice,
    said table including complementary vertical and radial surfaces juxtapositioned relative to the surfaces of said base,
    the relative dimensions of said surfaces of said base and said table being such that a pressurized film of liquid flows continuously between the surfaces through the pressure pads so that forces on the table are balanced by pressure in the pads providing a permanent separation of the surfaces and retaining the table in stable, accurate, frictionless relation to the base,
    said table having a pair of spaced supports,
    one of said supports having a horizontal opening therein defining a first cylindrical surface,
    said one support having axially spaced, oppositely facing radial surfaces extending outwardly from said cylindrical surface,
    each of said surfaces on said one support being provided with a plurality of circumferentially spaced pads,
    and an orifice associated with each said pressure pad,
    means for supplying liquid to each said orifice,
    said gimbal ring having a first cylindrical portion thereof projecting through the opening of said one support,
    said portion having complementary cylindrical and radial surfaces juxtapositioned relative to the surfaces of said one support,
    the relative dimensions of said first portion of said gimbal member and said surfaces of said first support being such that a pressurized film of liquid flows continuously between the surfaces through the pressure pads so that forces on the gimbal member are balanced by pressure in the pads providing a permanent separation of the surfaces and retaining the gimbal member in stable, accurate, frictionless relation to the first support,
    said second support having a horizontal opening therein defining a second cylindrical surface,
    a plurality of circumferentially spaced pressure pads in said surface,
    an orifice associated with each said pressure pad,
    means for supplying liquid under pressure to each said orifice,
    said gimbal member having a second cylindrical portion extending into said opening and defining a complementary surface juxtaposed relative to the cylindrical surface of said second support,
    the relative dimensions of said second portion and said second support being such that a pressurized film of liquid flows continuously between the surfaces through the pressure pads so that forces on the gimbal member are balanced by pressure in the pads providing a permanent separation of the surfaces and retaining the gimbal member in a stable, accurate, frictionless relation to the support.

2. The combination set forth in claim 1 wherein each said orifice is removably mounted adjacent its respective pad.

3. The combination set forth in claim 1 including a pressure gauge associated with each said orifice.

4. The combination set forth in claim 1 including drain passages adjacent the extremities of said surfaces containing pressure pads for draining the liquid flowing through the pressure pads and between the surfaces,
    said drain passages communicating with a common collecting area in the base.

5. In a gimbal table for mounting an instrument or the like for movement about accurately determined horizontal and vertical axes, the combination comprising
    a base,
    a table mounted on said base for rotation about a vertical axis,
    and a gimbal member mounted on said table for rotation about a horizontal axis,
    said base having a vertical opening therein defining a cylindrical surface,
    and axially spaced, oppositely facing radial surfaces projecting horizontally from said cylindrical surface,
    each of said surfaces having a plurality of circumferentially spaced pressure pads,
    an orifice associated with each pressure pad,
    means for supplying liquid under pressure to each said orifice,
    said table comprising a first section having an accurately machined under surface,
    a second section having parallel accurately machined upper and lower surfaces fixed to said under surface of said first section,
    and a third section having an accurately machined upper surface fixed to the lower surface of said second section,
    said under surface of said first section and said upper surface of said third section extending radially outwardly beyond the periphery of said second section to define radial surfaces juxtaposed relative to said radial surfaces of said base,
    the periphery of said second section defining a cylindrical surface in juxtaposition to said cylindrical surface of said base,
    the relative dimensions of said surfaces of said base and said table being such that a pressurized film of liquid flows continuously between the surfaces through the pressure pads so that forces on the table are balanced by pressure in the pads providing a permanent separation of the surfaces and retaining the table in a stable, accurate, frictionless relation to the base, said table having a pair of spaced supports, one of said supports having a horizontal opening therein defining a first generally cylindrical surface, said one support having axially spaced, oppositely facing radial surfaces extending outwardly from said cylindrical surface, each of said surfaces on said one support being provided with a plurality of circumferentially spaced pads, and an orifice associated with each said pressure pad, means for supplying liquid to each said orifice, said gimbal member having a first cylindrical portion thereof projecting through the opening of said one support, said first portion having a cylindrical surface in juxtaposition to said cylindrical surface of said first support, said first portion having an accurately machined diametral surface on the end thereof, a thrust plate having an accurately machined surface fixedly mounted against said diametral surface of said first portion, said surface of said thrust plate extending radially beyond said cylindrical surface to define a radial surface on said gimbal ring in juxtaposition to one said radial surface on said first support, said gimbal ring having another radial surface thereon in juxtaposition to said other radial surface on said first support, the relative dimensions of said first portion of said gimbal member and said surfaces of said first support being such that a pressurized film of liquid flows continuously between the surfaces through the pressure pads so that forces on the gimbal member are balanced by pressure in the pads providing a permanent separation of the surfaces and retaining the gimbal member in a stable, accurate, frictionless relation to the first support, said second support having a horizontal opening therein defining a second cylindrical surface, a plurality of circumferentially spaced pressure pads in said surface, an orifice associated with each said pressure pad, means for supplying liquid under pressure to each said orifice, said gimbal member having a second cylindrical portion extending into said opening and defining a complementary surface juxtaposed relative to the cylindrical surface of said second support, the relative dimensions of said second portion and said second support being such that a pressurized film of liquid flows continuously between the surfaces through the pressure pads so that forces on the gimbal member are balanced by pressure in the pads providing a permanent separation of the surfaces and retaining the gimbal member in accurate, frictionless relation relative to the support.

6. The combination set forth in claim 5 wherein said first and second supports comprise removable cap portions forming a part of said radial and cylindrical surfaces of supports and in which some of said pressure pads are formed, said first and second portions of said gimbal ring being made of a single unitary piece of material.

7. In a gimbal table and the like for mounting an instrument or the like for movement about accurately determined horizontal and vertical axes, the combination comprising a base, a table mounted on said base for rotation about a vertical axis, said base having a vertical opening therein defining a cylindrical surface, and axially spaced, oppositely facing radial surfaces projecting horizontally from said cylindrical surface, each of said surfaces having a plurality of circumferentially spaced pressure pads therein, an orifice associated with each pressure pad, means for supplying liquid under pressure to each said orifice, said table including complementary vertical and radial surfaces juxtapositioned relative to the surfaces of said base, the relative dimensions of said surfaces of said base and said table being such that a pressurized film of liquid flows continuously between the surfaces through the pressure pads so that forces on the table are balanced by pressure in the pads providing a permanent separation of the surfaces and retaining the table in stable, accurate, frictionless relation to the base.

8. The combination set forth in claim 7 wherein each said orifice is removably mounted adjacent its respective pad.

9. The combination set forth in claim 7 including a pressure gauge associated with each said orifice.

10. The combination set forth in claim 7 including drain passages adjacent the extremities of said surfaces containing pressure pads for draining the liquid flowing through the pressure pads and between the surfaces, said drain passages communicating with a common collecting area in the base.

11. In a gimbal table and the like for mounting an instrument or the like for movement about accurately determined horizontal and vertical axes, the combination comprising a base, a table rotatably mounted on said base about a vertical axis, said base having a vertical opening therein defining a cylindrical surface, and axially spaced, oppositely facing radial surfaces projecting horizontally from said cylindrical surface, each of said surfaces having a plurality of circumferentially spaced pressure pads, an orifice associated with each pressure pad, means for supplying liquid under pressure to each said orifice, said table comprising a first section having an accurately machined under surface, a second section having parallel accurately machined upper and lower surfaces fixed to said under surface of said first section, and a third section having an accurately machined upper fixed surface to the lower surface of said second section, said under surface of said first section and said upper surface of said third section extneding radially outwardly beyond the periphery of said second section to define radial surfaces juxtaposed relative to said radial surfaces of said base, the periphery of said second section defining a cylindrical surface in juxtaposition to said cylindrical surface of said base, the relative dimensions of said surfaces of said base and said table being such that a pressurized film of liquid flows continuously between the surfaces through the pressure pads so that forces on the table are balanced by pressure in the pads providing a permanent separation of the surfaces and retaining the table in stable, accurate, frictionless relation to the base.

12. In a gimbal table or the like for mounting an instrument or the like for movement about accurately determined horizontal and vertical axes, the combination comprising
a table,
and a gimbal member mounted on said table for rotation about a horizontal axis,
said table having a pair of spaced supports,
one of said supports having a horizontal opening therein defining a generally cylindrical surface,
said one support having axially spaced, oppositely facing radial surfaces extending outwardly from said cylindrical surface,
each of said surfaces on said one support being provided with a plurality of circumferentially spaced pads,
and an orifice associated with each said pressure pad,
means for supplying liquid to each said orifice,
said gimbal member having a first cylindrical portion thereof projecting through the opening of said one support,
said portion having complementary cylindrical and radial surfaces juxtapositioned relative to the surfaces of said one support,
the relative dimensions of said first portion of said gimbal member and said surfaces of said first support being such that a pressurized film of liquid flows continuously between the surfaces through the pressure pads so that forces on the gimbal member are balanced by pressure in the pads providing a permanent separation of the surfaces and retaining the gimbal member in stable, accurate, frictionless relation to the first support,
said second support having a horizontal opening therein defining a second cylindrical surface,
a plurality of circumferentially spaced pressure pads in said surface,
an orifice associated with each said pressure pad,
means for supplying liquid under pressure to each said orifice,
said gimbal member having a second cylindrical portion extending into said opening and defining a complementary surface juxtaposed relative to the cylindrical surface of said second support,
the relative dimensions of said second portion and said second support being such that a pressurized film of liquid flows continuously between the surfaces through the pressure pads so that forces on the gimbal member are balanced by pressure in the pads providing a permanent separation of the surfaces and retaining the gimbal member in a stable, accurate, frictionless relation relative to the support.

13. The combination set forth in claim 12 wherein each said orifice is removably mounted adjacent its respective pad.

14. The combination set forth in claim 12 including a pressure gauge associated with each said orifice.

15. The combination set forth in claim 12 including drain passages adjacent the extremities of said surfaces containing pressure pads for draining the liquid flowing through the pressure pads and between the surfaces,
said drain passages communicating with a common collecting area in the base.

16. In a gimbal table or the like for mounting an instrument or the like for movement about accurately determined horizontal and vertical axes, the combination comprising
a table,
and a gimbal member mounted on said table for rotation about a horizontal axis,
said table having a pair of spaced supports,
one of said supports having a horizontal opening therein defining a first generally cylindrical surface,
said one support having axially spaced, oppositely facing radial surfaces extending outwardly from said cylindrical surface,
each of said surfaces on said one support being provided with a plurality of circumferentially spaced pads,
and an orifice associated with each said pressure pad,
means for supplying liquid to each said orifice,
said gimbal member having a first cylindrical portion thereof projecting through the opening of said one support,
said first portion having a cylindrical surface in juxtaposition to said cylindrical surface of said first support,
said first portion having an accurately machined diametral surface on the end thereof,
a thrust plate having an accurately machined surface fixedly mounted against said diametral surface of said first portion,
said surface of said thrust plate extending radially beyond said cylindrical surface to define a radial surface on said gimbal ring in juxtaposition to one said radial surface on said first support,
said gimbal ring having another radial surface thereon in juxtaposition to said other radial surface on said first support,
the relative dimensions of said first portion of said gimbal member and said surfaces of said first support being such that a pressurized film of liquid flows continuously between the surfaces through the pressure pads so that forces on the gimbal member are balanced by pressure in the pads providing a permanent separation of the surfaces and retaining the gimbal member in a stable, accurate, frictionless relation to the first support,
said second support having a horizontal opening therein defining a second cylindrical surface,
a plurality of circumferentially spaced pressure pads in said surface,
an orifice associated with each said pressure pad,
means for supplying liquid under pressure to each said orifice,
said gimbal member having a second cylindrical portion extending into said opening and defining a complementary surface juxtaposed relative to the cylindrical surface of said second support,
the relative dimensions of said second portion and said second support being such that a pressurized film of liquid flows continuously between the surfaces through the pressure pads so that forces on the gimbal member are balanced by pressure in the pads providing a permanent separation of the surfaces and retaining the gimbal member in stable, accurate, frictionless relation to the support.

17. The combination set forth in claim 16 wherein said first and second supports comprise
removable cap portions forming a part of said radial and cylindrical surfaces of supports and in which some of said pressure pads are formed,
said first and second portions of said gimbal ring being made of a single unitary piece of material.

18. In a device for mounting an instrument or the like for movement about accurately determined horizontal and vertical axes, the combination comprising
a base,
a table mounted on said base for rotation about a vertical axis,
said base having a vertical opening therein defining a cylindrical surface,
and axially spaced, oppositely facing radial surfaces projecting horizontally from said cylindrical surface,
each of said surfaces having a plurality of circumferentially spaced pressure pads therein,
an orifice associated with each pressure pad,
means for supplying liquid under pressure to each said orifice, said table comprising a first section having an accurately machined under surface, a second section having parallel accurately machined upper and lower surfaces fixed to said under surface of said first section, and a third section having an accurately machined upper surface fixed to the lower surface of said second section, said under surface of said first section and said upper surface of said third section extending radially outwardly beyond the periphery of said second section to define radial surfaces juxtaposed relative to said radial surfaces of said base, the periphery of said second section defining a cylindrical surface in juxtaposition to said cylindrical surface of said base, the relative dimensions of said surfaces of said base and said table being such that a pressurized film of liquid flows continuously between the surfaces through the pressure pads so that forces on the table are balanced by pressure in the pads providing a permanent separation of the surfaces and retaining the table in stable, accurate, frictionless relation to the base, a pressure gauge associated with each said orifice, drain passages adjacent the extremities of said surfaces containing pressure pads for draining the liquid flowing through the pressure pads and between the surfaces, said drain passages communicating with a common collecting area in the base.

19. In a device for mounting an instrument or the like for movement about accurately determined horizontal and vertical axes, the combination comprising a base, and a member mounted on said base for rotation about a horizontal axis, said base having a pair of spaced supports, one of said supports having a horizontal opening therein defining a first generally cylindrical surface, said one support having axially spaced, oppositely facing radial surfaces extending outwardly from said cylindrical surface, each of said surfaces on said one support being provided with a plurality of circumferentially spaced pads, and an orifice associated with each said pressure pad, means for supplying liquid to each said orifice, said member having a first cylindrical portion thereof projecting through the opening of said one support, said first portion having a cylindrical surface in juxtaposition to said cylindrical surface of said first support, said first portion having an accurately machined diametral surface on the end thereof, a thrust plate having an accurately machined surface fixedly mounted against said diametral surface of said first portion, said surface of said thrust plate extending radially beyond said cylindrical surface to define a radial surface on said gimbal ring in juxtaposition to one said radial surface on said first support, said gimbal ring having another radial surface thereon in juxtaposition to said other radial surface on said first support, the relative dimensions of said first portion of said gimbal member and said surfaces of said first support being such that a pressurized film of liquid flows continuously between the surfaces through the pressure pads so that forces on the gimbal member are balanced by pressure in the pads providing a permanent separation of the surfaces and retaining the gimbal member in stable, accurate, frictionless relation relative to the first support, said second support having a horizontal opening therein defining a second cylindrical surface, a plurality of circumferentially spaced pressure pads in said surface, an orifice associated with each said pressure pad, means for supplying liquid under pressure to each said orifice, said member having a second cylindrical portion extending into said opening and defining a complementary surface juxtaposed relative to the cylindrical surface of said second support, the relative dimensions of said second portion and said second support being such that a pressurized film of liquid flows continuously between the surfaces through the pressure pads so that forces on the member are balanced by pressure in the pads providing a permanent separation of the surfaces and retaining the member in stable, accurate, frictionless relation to the support, said first and second supports comprising removable cap portions forming a part of said radial and cylindrical surfaces of supports and in which some of said pressure pads are formed, said first and second portions of said gimbal ring being made of a single unitary piece of material.

References Cited by the Examiner

UNITED STATES PATENTS 1,906,715  5/33  Penick.
3,016,273  1/62  Benoit _________________ 308—72

ROBERT C. RIORDON, *Primary Examiner.*

JOHN C. CHRISTIE, *Examiner.*